S. M. VAUCLAIN.
LOCOMOTIVE.
APPLICATION FILED MAR. 25, 1909.
927,386.
Patented July 6, 1909.
2 SHEETS—SHEET 1.
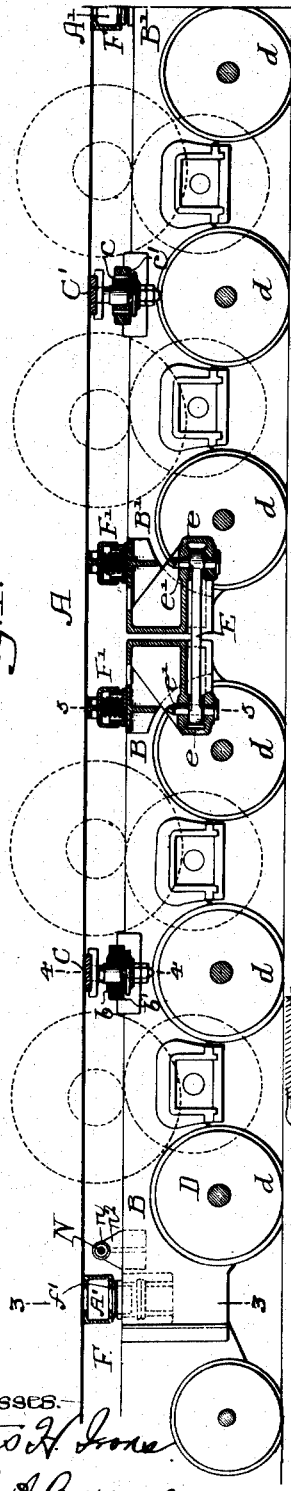
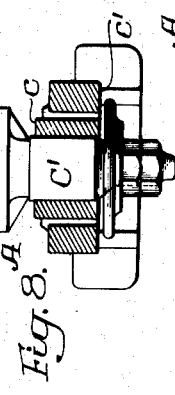
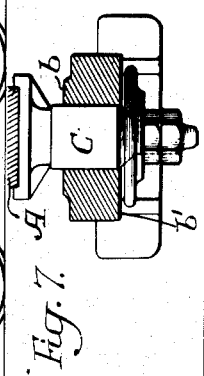
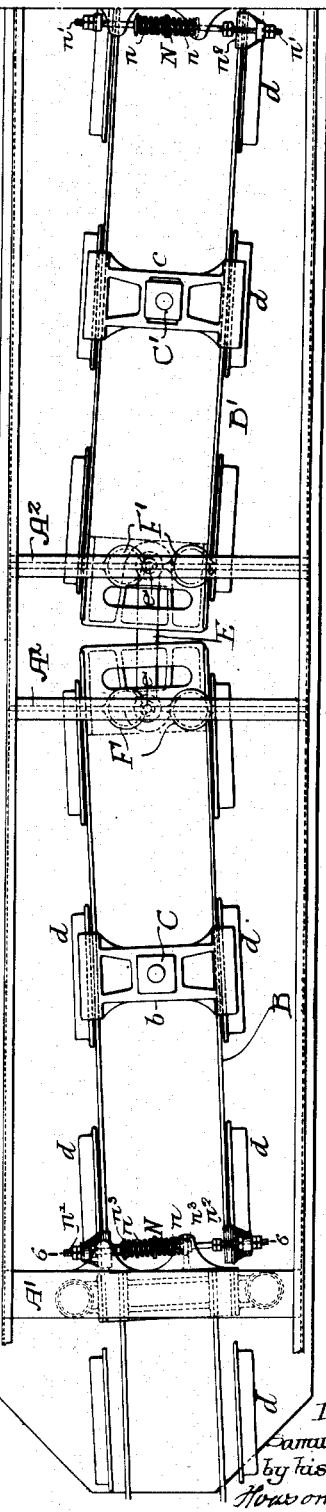

S. M. VAUCLAIN.
LOCOMOTIVE.
APPLICATION FILED MAR. 25, 1909.
927,386.
Patented July 6, 1909.
2 SHEETS—SHEET 2.
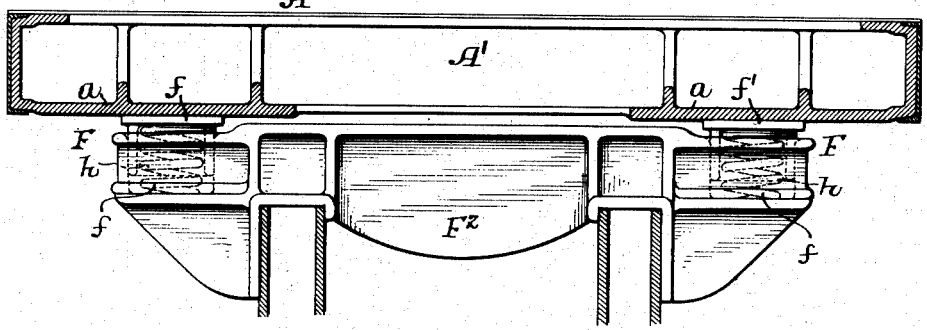
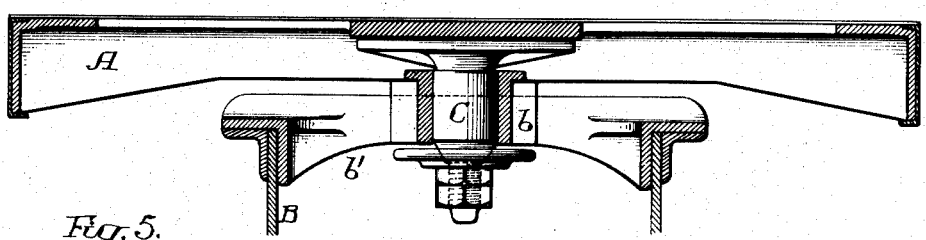
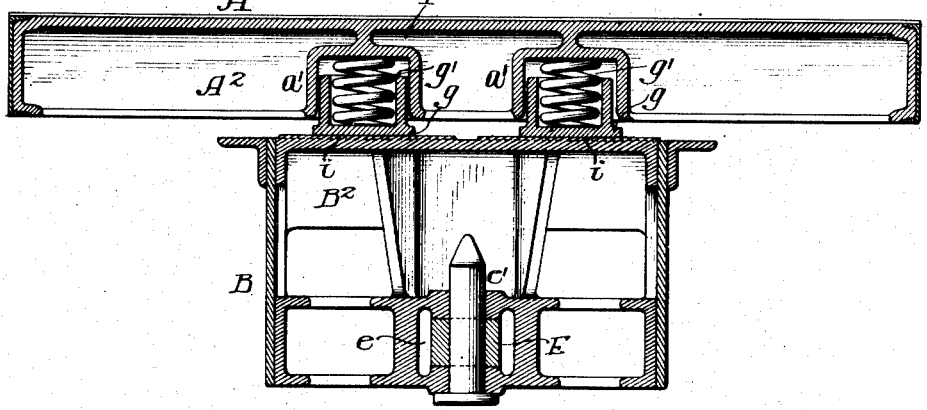
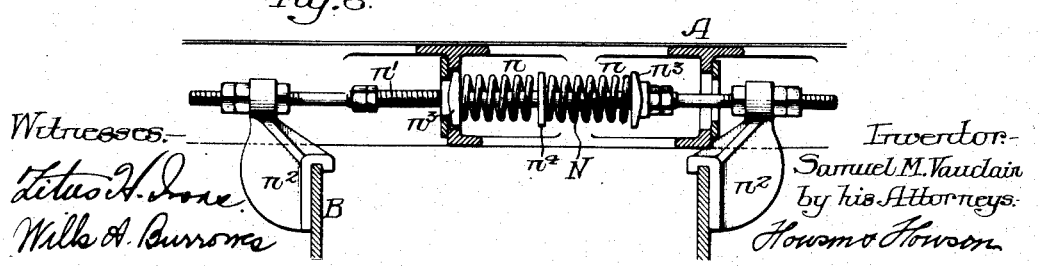

UNITED STATES PATENT OFFICE.

SAMUEL M. VAUCLAIN, OF PHILADELPHIA, PENNSYLVANIA, ASSIGNOR TO BURNHAM, WILLIAMS & COMPANY, OF PHILADELPHIA, PENNSYLVANIA, A FIRM.

LOCOMOTIVE.

No. 927,386.          Specification of Letters Patent.          Patented July 6, 1909.

Application filed March 25, 1909. Serial No. 485,678.

*To all whom it may concern:*

Be it known that I, SAMUEL M. VAUCLAIN, a citizen of the United States, residing in Philadelphia, Pennsylvania, have invented certain Improvements in Locomotives, of which the following is a specification.

My invention relates to certain improvements in locomotives and particularly those of the electric type, although the invention can be used in connection with the articulated type of steam locomotive.

The object of my invention is to provide a locomotive with a long wheel base and so couple the trucks that they will readily pass around comparatively sharp curves; the two trucks being connected together, forming practically an articulated truck and one truck connected to the body by a rigid pivot and the other truck being connected to the body by a yielding pivot. This object I attain in the following manner, reference being had to the accompanying drawings, in which:—

Figure 1, is a longitudinal sectional view of an electric locomotive, illustrating my invention; Fig. 2, is a plan view, showing the frame of the body portion in outline; Fig. 3, is a transverse sectional view on the line 3—3, Fig. 1; Fig. 4, is a transverse sectional view on the line 4—4, Fig. 1; Fig. 5, is a transverse sectional view on the line 5—5, Fig. 1; Fig. 6, is a transverse sectional view on the line 6—6, Fig. 2; and Figs. 7 and 8, are enlarged sectional views of the pivots illustrated in Fig. 1.

A, is the body portion of an electric locomotive or car. B—B' the two trucks on which are mounted axles D, having wheels $d$, each truck in the present instance is provided with three axles, although the number of axles will depend considerably on the size of the locomotive.

Secured to the under side of the car body A is a pivot-pin C, adapted to a bearing $b$ in the cross frame $b'$ of the truck B, as clearly illustrated in Fig. 4, so that while the truck B can turn on the pivot, it has no longitudinal movement independent of the body portion A. C' is a pivot-pin projecting from the under side of the body A and extends into a bearing $c$, mounted in an elongated opening in the cross frame $c'$ of the truck B'. This construction allows a certain amount of longitudinal movement of the truck B'. Both pivot-pins have washers, as clearly illustrated in Fig. 4, so as to limit their vertical movement. The two trucks B—B' are connected together by a link E, the link being adapted to sockets $e$ in the frames of the two trucks and is attached to the trucks by coupling pins $e'$, so that while the trucks are free to move on their pivots to accommodate themselves to the curved tracks, the moment the trucks are deflected from the straight line then the truck B' will have a slight longitudinal movement in respect to the truck B. The bearing for the truck B is practically a fixed bearing, while the bearing for the truck B' is free, so that the truck can move longitudinally to a certain extent. This is necessary, as the link connecting the two trucks is rigid. The weight of the car body is not carried by the pivots but by bearings on the ends of the trucks. On one end of each truck is a bearing F and on the other end is a bearing F'. Each bearing F consists of a cross frame $F^2$ secured to the truck and having sockets $f$, springs $h$ adapted to the sockets and cap plates $f'$ mounted on the springs and resting against sliding bearing surfaces $a$ on the cross beam A' of the body A, as shown in Fig. 3. The bearings F' each consists of a cross beam $A^2$ of the body A, having sockets $a'$, coiled springs $g'$ and cap plate $g$ adapted to the sockets. The cap plates rest upon sliding bearings $i$ carried by the end frame $B^2$ of the truck, as clearly shown in Fig. 5. Formed in each end frame is the socket for the coupling link E.

N is a centering device, made as clearly shown in Fig. 6. The springs $n$—$n$ are mounted on a rod $n'$, secured to brackets $n^2$ on the frame of the truck, and the rod passes through openings in the brackets on the frame A of the body portion and on the rod are plates $n^3$ and a division plate $n^4$, and the parts are so arranged that when the trucks are moved out of the longitudinal line of the body portion, the springs will aid in the return of the trucks to position and tend to keep them central.

It will be seen that while one truck B has a revolving motion only on its pivot-pin C, the truck B' has both a revolving motion and a fore and aft motion, so that while the two trucks are connected together by an unyielding coupling link, the trucks will readily accommodate themselves to the curve of the track, due to the fore and aft movement of the truck B' on its pivot.

As before remarked, while I have described the invention as particularly adapted for use on electric locomotives, it can be readily applied to steam or other fluid operative locomotives of the articulated type.

I claim:—

1. The combination in a locomotive of the body portion, two trucks mounted under the body portion, a link connecting the two trucks, a pivot for each truck, one of said trucks being capable of revolving on its pivot and having a to and fro motion thereon.

2. The combination in a locomotive, of a body portion, two trucks mounted under the body portion, a link connecting the two trucks, one of said trucks being so pivoted to the body that it will have only a revolving motion and the other truck being so pivoted to the body portion that it has not only a revolving motion but a fore and aft motion.

3. The combination in a locomotive, of a body portion, two trucks mounted under the body portion, a pivot for each truck, one truck having a to and fro motion as well as a rotary motion on its pivot, with independent bearings taking the weight of the frame.

4. The combination in a locomotive, of the body portion, two trucks pivoted to the body portion, one of said trucks having not only a rotary motion but a fore and aft motion on its pivot, a link connecting the two trucks, and spring supports mounted between the ends of each truck and the body portion, and taking the weight of the frame off the pivots.

In testimony whereof, I have signed my name to this specification, in the presence of two subscribing witnesses.

SAMUEL M. VAUCLAIN.

Witnesses:
   JACQUES L. VAUCLAIN,
   WM. RHODES.